Nov. 30, 1926.
G. H. JACKSON ET AL
1,608,793
COUPLING DEVICE FOR TRACTOR AND TRAILER VEHICLES
Filed Sept. 12, 1925  2 Sheets-Sheet 2
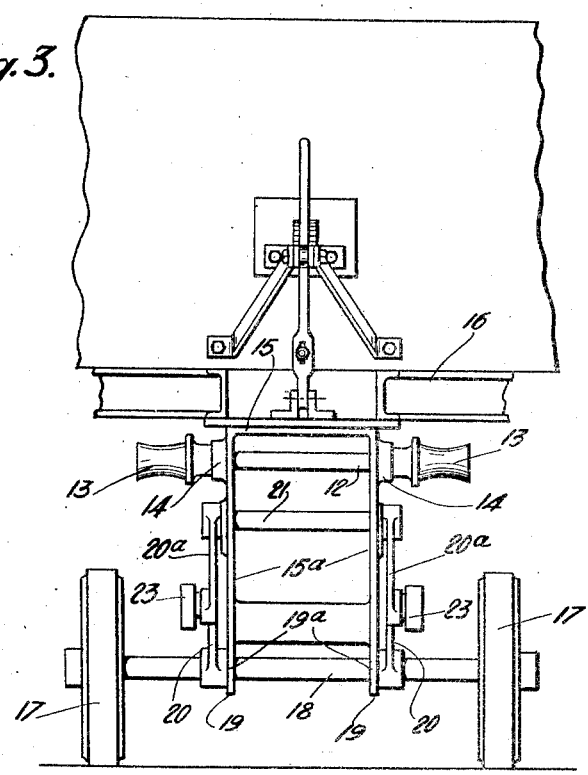
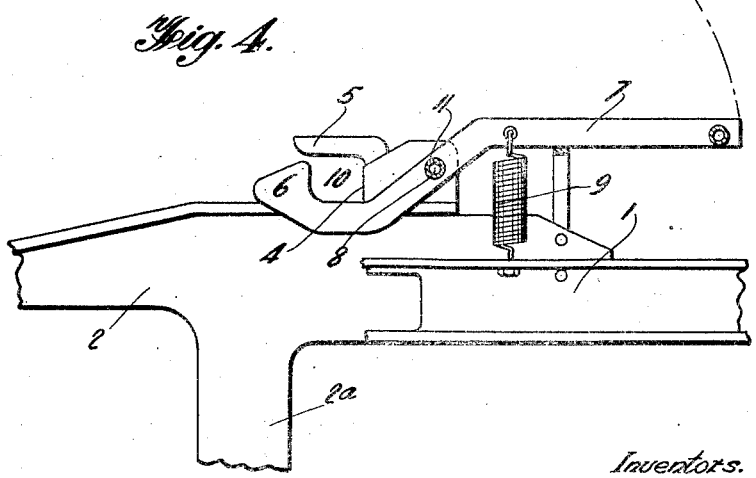
Inventors.
George Hunt Jackson & Albert Henry Sommer.
Per:—
Rayner & Co.
Attorneys.

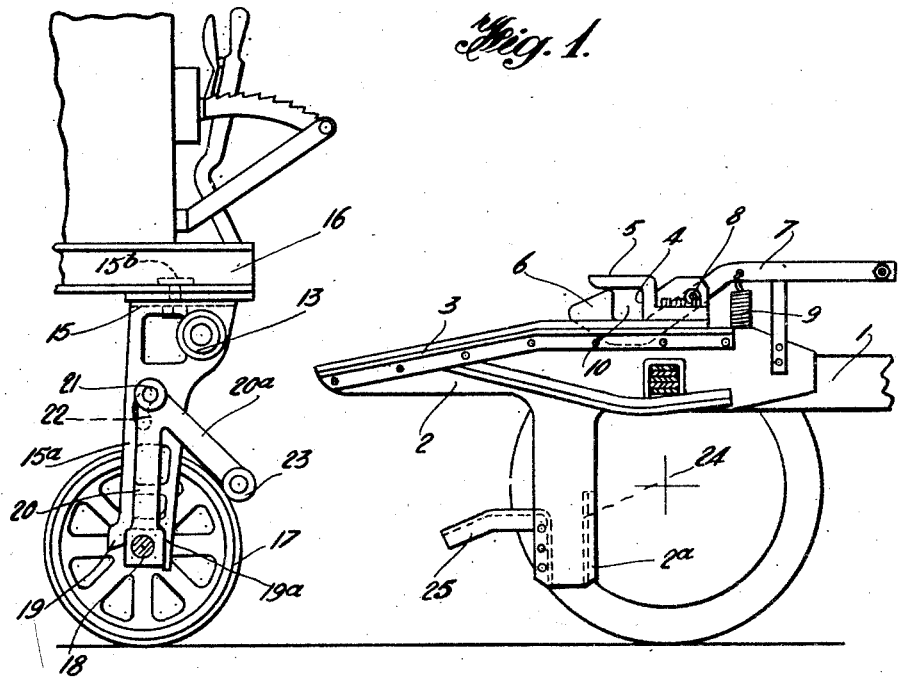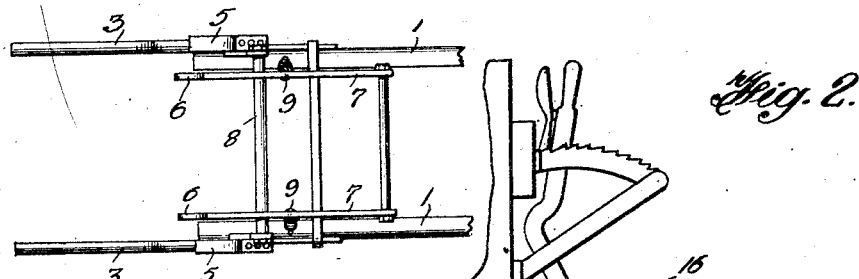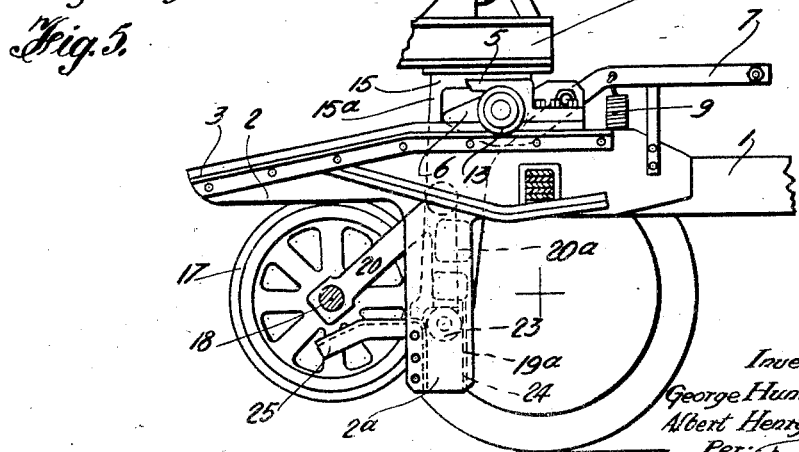

Patented Nov. 30, 1926.

1,608,793

UNITED STATES PATENT OFFICE.

GEORGE HUNT JACKSON, OF ENFIELD, AND ALBERT HENRY SOMMER, OF WARE, ENGLAND.

COUPLING DEVICE FOR TRACTOR AND TRAILER VEHICLES.

Application filed September 12, 1925, Serial No. 56,033, and in Great Britain September 26, 1924.

This invention relates to improvements in detachable trailers of compound vehicles, in which a tractor supports one end of a load carrying trailer vehicle.

The object of this invention is to enable the tractor portion of such a vehicle to be quickly and safely attached or detached from the trailer vehicle without the driver having to leave his seat or require outside assistance.

Broadly this invention is characterized by the provision of coacting coupling means for the trailer vehicle and the rear of the tractor, the arrangement being such that when the tractor vehicle is moved rearwards towards the trailer, or the trailer is moved towards the rear of the tractor vehicle in normal linear relationship, the two become automatically coupled, and the front wheels of the trailer are lifted clear of the ground.

According to the preferred embodiment of this invention, the rear of the tractor unit is provided with a guideway having adjacent its forward end an automatic catch adapted to receive a roller member associated with the trailer unit, such guideway being at one point in a higher plane than the said roller so that the fore end of the trailer unit is lifted upwards when the guideway travels underneath said roller, means being provided to automatically disengage the front wheel or wheels of the trailer unit clear of the ground as the two units are coupled.

In practice the tractor is "backed" up towards the front of the trailer load carrying body in order to be connected thereto and support the same. As the tractor approaches the forward end of the trailer, a carrying roller on each side of the trailer under-carriage engages a slightly inclined way or ways provided on the rear of the tractor chassis. Continued rearward movement of the tractor causes the trailer roller members to ride up the inclined way or ways until they abut against stops against which they are adapted to be locked automatically by a pivoted locking plate, which can be operated by a rod or the like connected to a suitable operating lever provided in the driver's cab or other convenient position on the tractor vehicle when it is desired to disconnect the trailer from the tractor.

The forward end of the load carrying trailer body is arranged to be supported upon one or more wheels when it is disconnected from the tractor. This wheel or wheels is or are each mounted upon a pair of arms pivoted to an underframe beneath the trailer chassis. The said underframe is mounted on a turn-table so enabling the trailer to be steered when detached and forming the pivoting point of the rear wheels when being towed by the tractor. Attachments for horse or manual haulage can be fitted if so desired.

In order that this invention may be clearly understood and readily carried into effect, we have appended hereto two sheets of drawings illustrating the preferred embodiment of same, and wherein:—

Fig. 1 is a side view showing the fore and rear ends of a trailer and tractor respectively, the "off" rear wheel of the tractor being removed for clearness of illustration.

Fig. 2 is a view of the same parts as shown in Fig. 1 but showing them coupled together.

Fig. 3 is a front view of the trailer,

Fig. 4 is a side view of the automatic coupling device on the rear of the tractor unit, and Fig. 5 is a plan view showing the rear end of the tractor.

Referring to the drawings, the tractor chassis 1 is fitted in a linear direction in rear with a pair of metal frames 2 located symmetrically either side of the longitudinal centre of the chassis and each having a guide rail 3, the rear half of each guide rail sloping downwards rearwardly, and the front half being substantially horizontal. At the forward end of each guide rail 3 is an abutment 4 having a rearwardly extending overhang 5. Between the overhangs 5 and beneath them is an automatic catch 6 constituting the rear end of a pair of arms 7 disposed longitudinally of the chassis and fulcrumed at 8 by means of a transverse rod 11, such arms 7 being normally held with the catch 6 aligned or almost aligned with the overhang 5 by the influence of a spring 9. The space 10 in side elevation between the catch 6 and its overhang 5 of the abutment 4 is adapted to engage round an axle 12 having a pair of rotatable rollers 13 mounted thereon. This axle 12 is supported in bosses 14 formed on an underframe 15 of the trailer 16, the tractor being first linearly aligned with the trailer and backed towards it so as to cause the guide rails 3 to pass under the rollers 13 until further movement is prevented by the rollers meeting the abutments 4.

The trailer is automatically locked to the tractor consequent upon the axle 12 tripping over the pawl shaped catch 6.

The underframe 15 rotates relatively of the chassis of the trailer body about a turntable 15$^b$ so as to enable the rear wheels (not shown) of the trailer to follow the correct track behind the tractor. To prevent the front wheel or wheels 17 of the trailer from interfering with the manoeuvering of the coupled vehicles, means is provided to lift the front wheel or wheels clear of the ground as the two vehicles are coupled.

The axle 18 of the wheels 17 is engaged in the bifurcated lower ends 19 of the two side supports 15$^a$ of the underframe 15 when the trailer is not coupled to the tractor, but the axle 18 is disengaged from such bifurcated ends and swung rearwards so as to raise the wheels 17 when the trailer and tractor are coupled. This operation is obtained by mounting the axle 18 in the lower ends of a pair of depending arms 20 connected at their upper ends by a transverse bar 21 engaged in a pair of arcuate slots 22 in the side supports 15$^a$, consequently when the rollers 13 ride up the inclined guides 3 and the trailer body is gradually lifted the wheels 17 still maintain contact with the ground and the axle 18 clears the bifurcated lower ends 19 of the side supports 15$^a$. By this means the wheels 17 are free to be swung rearwards in an arcuate path about the axis of the bar 21 and this is effected automatically by rollers 23 at the free ends of cranked extensions 20$^a$ of the arms 20 striking against abutments 24 supported on depending portions 2$^a$ of the frames 2 as shown in Fig. 2.

The trailer can be readily disconnected from the tractor by pulling upwards the front end of the arms 7 to disengage the catch 6 from the axle 12, and driving the tractor forward during which time the wheels 17 will drop and the axle 18 become disposed beneath the bifurcated lower ends of the side supports 15$^a$ ready to support the front end of the trailer, the front bifurcation 19$^a$ of each bifurcation 19 being longer than the rear to serve as an abutment for the axle 18.

To ensure correct location of the axle between the bifurcated ends 19 and 19$^a$ when the trailer is being uncoupled, a ramp or a pair of guides 25 is or are secured to the lower ends of the depending portions 2$^a$ of the frames 2 upon which the rollers 23 rest when the vehicles are coupled, and along and down which the rollers 23 are guided as the vehicles are being uncoupled. By this means it will be impossible for the trailer to become disconnected from the tractor before the wheels 17 are in correct position to support the trailer.

We claim:—

1. In a coupling device for tractor and trailer vehicles, a frame mounted to swivel about a vertical axis on the fore part of the trailer, means for coupling said frame to the tractor, means for lifting said frame when said frame is coupled to the tractor, downwardly projecting members on said frame, arms pivoted to said frame to permit relative movement in a vertical direction, supporting wheels on said arms, bifurcated lower ends to said downwardly projecting frame members, means on said arms to engage said bifurcated lower ends when said frame is uncoupled from said tractor, said engaging means being adapted to disengage said bifurcated lower ends when said frame is raised, and means for swinging said arms about their pivots when said engaging means is disengaged.

2. In a coupling device for tractor and trailer vehicles, a frame mounted so as to swivel about a vertical axis on the fore part of the trailer, at least one horizontally disposed roller on this frame, an inclined guideway, for each such roller, mounted on the rear of the tractor, to engage under and lift the same, a hook-shaped catch on the tractor adapted to engage and interlock with a part of the trailer, downwardly projecting members on the frame at the front of the trailer, arms pivoted to the frame so as to permit relative movement in a vertical direction, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, and means for swinging the arms about their pivots when so disengaged.

3. In a coupling device for tractor and trailer vehicles, a frame mounted so as to swivel about a vertical axis on the fore part of the trailer, a pair of rollers mounted on a transverse shaft in this frame, an inclined guide-way, for each such roller, mounted on the rear of the tractor, to engage under and lift the same, a hook-shaped catch on the tractor adapted to engage and interlock with the transverse shaft carrying the rollers, downwardly projecting members on the frame at the front of the trailer, arms pivoted to the frame so as to permit relative movement in a vertical direction, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guideways when they are being coupled, and means for swinging the arms about their pivot when so disengaged.

4. In a coupling device for tractor and trailer vehicles, a frame mounted so as to swivel about a vertical axis on the forepart of the trailer, at least one horizontally disposed roller on this frame, an inclined guide-way, for each such roller, mounted on the rear of the tractor, to engage under and lift the same, a hook-shaped catch on the tractor adapted to engage and interlock with a part of the trailer, downwardly projecting members on the frame at the front of the trailer, arms pivoted to the frame by a pin and slot connection, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, and means for swinging the arms about their pivots when so disengaged.

5. In a coupling device for tractor and trailer vehicles, a frame mounted so as to swivel about a vertical axis on the fore part of the trailer, a pair of rollers mounted on a transverse shaft in this frame, an inclined guide-way, for each such roller, mounted on the rear of the tractor, to engage under and lift the same, a hook-shaped catch on the tractor adapted to engage and interlock with the transverse shaft carrying the rollers, downwardly projecting members on the frame at the front of the trailer, arms pivoted to the frame by a pin and slot connection, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, and means for swinging the arms about their pivot when so disengaged.

6. In a coupling device for tractor and trailer vehicles, a frame mounted so as to swivel about a vertical axis on the fore part of the trailer, at least one horizontally disposed roller on this frame, an inclined guide-way, for each such roller, mounted on the rear of the tractor to engage under and lift the same, a hook-shaped catch on the tractor adapted to engage and interlock with a part of the trailer, downwardly projecting members on the frame at the front of the trailer, arms pivoted to the frame so as to permit relative movement in a vertical direction, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms and abutments on the tractor with which these extensions engage so as to turn the arms about their pivots.

7. In a coupling device for tractor and trailer vehicles, a frame mounted so as to swivel about a vertical axis on the fore part of the trailer, a pair of rollers mounted on a transverse shaft in this frame, an inclined guide-way, for each such roller, mounted on the rear of the tractor to engage under and lift the same, a hook-shaped catch on the tractor adapted to engage and interlock with the transverse shaft carrying the rollers, downwardly projecting members on the frame at the front of the trailer, arms pivoted to the frame so as to permit relative movement in a vertical direction, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms and abutments on the tractor with which these extensions engage so as to turn the arms about their pivots.

8. In a coupling device for tractor and trailer vehicles, a frame mounted so as to swivel about a vertical axis on the fore part of the trailer, at least one horizontally disposed roller on this frame, an inclined guide-way, for each such roller, mounted on the rear of the tractor to engage under and lift the same, a hook-shaped catch on the tractor adapted to engage and interlock with a part of the trailer, downwardly projecting members on the frame at the front of the trailer, arms pivoted to the frame by a pin and slot connection, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms and abutments on the tractor with which these extensions engage so as to turn the arms about their pivots.

9. In a coupling device for tractor and trailer vehicles, a frame mounted so as to swivel about a vertical axis on the fore part of the trailer, a pair of rollers mounted on a transverse shaft in this frame, an inclined guide-way, for each such roller, mounted on the rear of the tractor to engage under and lift the same, a hook-shaped catch on the tractor adapted to engage and interlock with the transverse shaft carrying the rollers, downwardly projecting members on the frame at the front of the trailer, arms pivoted to the frame by a pin and slot connection, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms, and abutments on the tractor with which these extensions engage so as to turn the arms about their pivots.

10. In a coupling device for tractor and trailer vehicles, a frame mounted so as to swivel about a vertical axis on the fore part of the trailer, at least one horizontally disposed roller on this frame, an inclined guide-way, for each such roller, mounted on the rear of the tractor to engage under and lift the same, a hook-shaped catch on the tractor adapted to engage and interlock with a part of the trailer, downwardly projecting members on the frame at the front of the trailer, arms pivoted to the frame so as to permit relative movement in a vertical direction, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms and abutments on the tractor with which these extensions engage so as to turn the arms about their pivots, a roller on each extension and guides on the abutments so as to cause the supporting wheels to be lowered gently when the tractor and trailer are uncoupled.

11. In a coupling device for tractor and trailer vehicles, a frame mounted so as to swivel about a vertical axis on the fore part of the trailer, a pair of rollers mounted on a transverse shaft in this frame, an inclined guide-way, for each such roller, mounted on the rear of the tractor to engage under and lift the same, a hook-shaped catch on the tractor adapted to engage and interlock with the transverse shaft carrying the rollers, downwardly projecting members on the frame at the front of the trailer, arms pivoted to the frame so as to permit relative movement in a vertical direction, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms, abutments on the tractor with which these extensions engage so as to turn the arms about their pivots, a roller on each extension and guides on the abutments so as to cause the supporting wheels to be lowered gently when the tractor and trailer are uncoupled.

12. In a coupling device for tractor and trailer vehicles, a frame mounted so as to swivel about a vertical axis on the fore part of the trailer, at least one horizontally disposed roller on this frame, an inclined guide-way, for each such roller, mounted on the rear of the tractor to engage under and lift the same, a hook-shaped catch on the tractor adapted to engage and interlock with a part of the trailer, downwardly projecting members on the frame at the front of the trailer, arms pivoted to the frame by a pin and slot connection, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guide-ways when they are being coupled, extensions on the front of the pivoted arms, abutments on the tractor with which these extensions engage so as to turn the arms about their pivots, a roller on each extension and guides on the abutments so as to cause the supporting wheels to be lowered gently when the tractor and trailer are uncoupled.

13. In a coupling device for tractor and trailer vehicles, a frame mounted so as to swivel about a vertical axis on the fore part of the trailer, a pair of rollers mounted on a transverse shaft in this frame, an inclined guide-way, for each such roller, mounted on the rear of the tractor to engage under and lift the same, a hook-shaped catch on the tractor adapted to engage and interlock with the transverse shaft carrying the rollers, downwardly projecting members on the frame at the front of the trailer, arms pivoted to the frame by a pin and slot connection, a transverse axle carrying supporting wheels mounted on these arms, a bifurcated lower end to the downwardly projecting frame members to engage over the said axle when the tractor and trailer are uncoupled, but which will be disengaged by the transverse rollers riding up the inclined guideways when they are being coupled, extensions on the front of the pivoted arms, abutments on the tractor with which these extensions engage so as to turn the arms about their pivots, a roller on each extension and guides on the abutments so as to cause the supporting wheels to be lowered gently when the tractor and trailer are uncoupled.

GEORGE HUNT JACKSON.
ALBERT HENRY SOMMER.